US008466603B2

(12) United States Patent
Takahashi et al.

(10) Patent No.: US 8,466,603 B2
(45) Date of Patent: Jun. 18, 2013

(54) DRIVING APPARATUS

(75) Inventors: Makoto Takahashi, Tokyo (JP); Masato Nito, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 190 days.

(21) Appl. No.: 13/061,573

(22) PCT Filed: Aug. 25, 2009

(86) PCT No.: PCT/JP2009/064791
§ 371 (c)(1),
(2), (4) Date: Mar. 1, 2011

(87) PCT Pub. No.: WO2010/024252
PCT Pub. Date: Mar. 4, 2010

(65) Prior Publication Data
US 2011/0163632 A1    Jul. 7, 2011

(30) Foreign Application Priority Data

Sep. 1, 2008    (JP) ................................. 2008-223561

(51) Int. Cl.
*H02N 2/04* (2006.01)
(52) U.S. Cl.
USPC .................. 310/323.02; 310/323.03; 359/894
(58) Field of Classification Search
USPC ........................ 310/323.02, 323.03; 359/824
See application file for complete search history.

(56) References Cited

U.S. PATENT DOCUMENTS

| | | | |
|---|---|---|---|
| 7,268,465 B2 * | 9/2007 | Okamoto | 310/323.02 |
| 2006/0103266 A1 | 5/2006 | Okamoto | |
| 2007/0176514 A1 * | 8/2007 | Lei et al. | 310/328 |
| 2008/0315721 A1 * | 12/2008 | Wada et al. | 310/323.02 |
| 2009/0027785 A1 * | 1/2009 | Tanaka et al. | 359/824 |
| 2010/0052474 A1 * | 3/2010 | Honma et al. | 310/317 |

FOREIGN PATENT DOCUMENTS

| | | |
|---|---|---|
| JP | 5-191987 A | 7/1993 |
| JP | 2-261073 A | 10/1993 |
| JP | 3218851 B2 | 10/1995 |
| JP | 3141714 B2 | 6/1996 |
| JP | 2002-119-74 A | 4/2002 |

(Continued)

OTHER PUBLICATIONS

Machine Translation of JP 2008197473, Yamada Tsukasa, Aug. 8, 2008.*

(Continued)

*Primary Examiner* — Walter Benson
*Assistant Examiner* — Bryan Gordon
(74) *Attorney, Agent, or Firm* — Holtz, Holtz, Goodman & Chick, P.C.

(57) ABSTRACT

A driving apparatus is capable of efficiently transmitting a reciprocating displacement of an electromechanical transducer element to a movement member and of effectively utilizing a vacant space. The driving apparatus includes an electromechanical transducer element having first and second end faces opposed to each other in a direction of expansion and contraction thereof, a vibration friction portion attached to the second end face of the electromechanical transducer element, and a movement member friction-bonded to the vibration friction portion. The movement member is movable along the direction of expansion and contraction of the electromechanical transducer element. The driving apparatus includes a vibration transmission member arranged between the second end face of the electromechanical transducer element and an end face of the vibration friction portion. A central axis of the electromechanical transducer element and a central axis of the vibration friction portion are not on the same line.

18 Claims, 8 Drawing Sheets

FOREIGN PATENT DOCUMENTS

| | | | |
|---|---|---|---|
| JP | 2006-141133 | A | 6/2006 |
| JP | 2006-303955 | A | 11/2006 |
| JP | 2006-304529 | A | 11/2006 |
| JP | 2007-202377 | A | 8/2007 |
| JP | 2008-197473 | A | 8/2008 |

OTHER PUBLICATIONS

International Search Report dated Nov. 24, 2009 issued in International Appln. No. PCT/JP2009/064791.

* cited by examiner

DRIVING APPARATUS

This application is a U.S. National Phase Application under 35 USC 371 of International Application PCT/JP2009/064791 filed Aug. 25, 2009.

TECHNICAL FIELD

The present invention relates to a driving apparatus, and more particularly to a driving apparatus using an electromechanical transducer element such as a piezoelectric element.

BACKGROUND ART

A linear actuator (driving apparatus) using an electromechanical transducer element, such as a piezoelectric element, an electrostrictor element, or a magnetostrictor element, has heretofore been used as an actuator for auto-focusing or an actuator for zooming.

JP-B 3218851 (Patent Document 1) discloses a driving method of a driving apparatus using an electromechanical transducer element such as a piezoelectric element that is capable of suppressing ringing vibration generated in the electromechanical transducer element and of high-speed actuation. The driving apparatus disclosed in Patent Document 1 has the electromechanical transducer element such as the piezoelectric element, a driving member (vibration axis) bonded to the transducer element so that the driving member moves along with the transducer element, and a driven member (zoom lens body tube) friction-bonded to the driving member. In Patent Document 1, the driven member (zoom lens body tube) is driven with a devised driving signal being applied to the piezoelectric element (electromechanical transducer element).

Furthermore, JP-A 2006-304529 (Patent Document 2) discloses a high-performance driving apparatus using a movable element having a high bending modulus without lowering a moving speed or a driving force. The cost and weight of the driving apparatus can be reduced as compared to a case where the movable element is made of a metal material. The movable element of the driving apparatus disclosed in Patent Document 2 is formed of a liquid crystal polymer including carbon fiber. The driving apparatus disclosed in Patent Document 2 comprises a piezoelectric element (electromechanical transducer element) capable of expansion and contraction in response to an applied voltage, a driving axis (vibration friction portion) fixed to an end of the piezoelectric element in a direction of expansion and contraction of the piezoelectric element, a movable element (movement member) friction-bonded to the driving axis so as to be slidable with respect to the actuation axis, and a weight (stationary member or anchor) fixed to the other end of the piezoelectric element in the direction of expansion and contraction of the piezoelectric element by an adhesive. The driving axis is vibrated by varying the speed or acceleration of expansion and contraction of the piezoelectric element, so that the movable element (movement member) is moved along the driving axis (vibration friction portion).

Moreover, JP-B 3141714 (Patent Document 3) discloses a driving apparatus capable of stably actuating a movement member at a high speed. The driving apparatus disclosed in Patent Document 3 comprises a stationary member, an electromechanical transducer element fixed to an end of the stationary member in a direction of expansion and contraction of the electromechanical transducer element, a driving member (vibration friction portion) which is bonded to the other end of the electromechanical transducer element in the direction of expansion and contraction of the electromechanical transducer element and which is supported so as to be movable along the direction of expansion and contraction of the electromechanical transducer element, the movement member friction-bonded to the driving member and supported so as to be movable along the direction of expansion and contraction of the electromechanical transducer element, and frictional force providing means for generating a frictional force between the driving member (vibration friction portion) and the movement member. The frictional force adding means includes an elastic member fixed to the movement member for generating a pressing force and an insertion member for transmitting the pressing force generated by the elastic member to the driving member. A contacting portion between the movement member and the driving member and a contacting portion of the insertion member have a V-shaped cross-section.

JP-A 2002-119074 (Patent Document 4) discloses a driving apparatus using an electromechanical transducer element. The driving apparatus disclosed in Patent Document 4 comprises the electromechanical transducer element having an end fixed to a support base (stationary member), a vibration member (vibration friction portion) fixed to the other end of the electromechanical transducer element, and a movement body (movement member) engaging with the vibration member under a predetermined frictional force. A carbon rod is used as the vibration member (vibration friction portion).

Furthermore, JP-A 2006-141133 (Patent Document 5) discloses a driving apparatus having a short overall length. The driving apparatus disclosed in Patent Document 5 comprises an electromechanical transducer element having an end fixed to a fixed body (anchor or stationary member), a driving friction member (vibration friction portion) fixed to the other end of the electromechanical transducer element, and a movement body (movement member) friction-engaging with the driving friction member. Ceramic material, engineering plastic such as polyphenylene sulfide resin (PPS resin) or liquid crystal polymer (LCP resin), carbon fiber reinforced resin, and fiber-glass reinforced resin are used as a material for the driving friction member.

JP-A 2006-303955 (Patent Document 6) discloses an image pickup device capable of simplifying a structure and reducing cost. The image pickup device disclosed in Patent Document 6 comprises a lens driving part for moving an image pickup lens along an optical axis. The lens driving part employs SIDM (Smooth Impact Drive Mechanism). The lens driving partcomprises an SIDM weight portion attached to a driving-part attachment portion by a certain adhesive, a piezoelectric element portion (electromechanical transducer element) connected to the SIDM weight portion so as to be capable of expansion and contraction in a direction of an optical axis by energization, and a shaft portion (vibration friction portion) connected to the piezoelectric element portion so as to extend along the optical axis. The shaft portion of the lens driving part is sandwiched in a driving-part holding member (movement member) of a driving force transmission part along a direction substantially perpendicular to the optical axis.

JP-A 2007-202377 (Patent Document 7) discloses an electromechanical actuator structure capable of increasing a moving speed of a passive member and lowering an operating frequency of driving pulses. The electromechanical actuator structure disclosed in Patent Document 7 comprises an electric actuator (electromechanical transducer element) having a bottom joined to a base and a top surface, and an elastic driving member (vibration friction portion) joined to the top surface of the electric actuator. The elastic driving member comprises a stationary part joined to the top surface of the electric actuator so as to be reciprocated along with the electric actuator and an elastic part extending from the stationary part to the outside of the electric actuator and having a conductive part. A passive member (movement member) is provided within the conductive part of the elastic part of the elastic driving member. An elastic member is attached to the elastic part of the elastic driving member. The elastic member presses the passive member against the conductive part of the elastic part of the elastic driving member so that the passive member friction-engages with the conductive part of the elastic part of the elastic actuation member. Thus, the passive member (movement member) is moved along with the elastic driving member (vibration friction portion).

PRIOR ART

Patent Document(s)
Patent Document 1: JP-B 3218851
Patent Document 2: JP-A 2006-304529
Patent Document 3: JP-B 3141714
Patent Document 4: JP-A 2002-119074
Patent Document 5: JP-A 2006-141133
Patent Document 6: JP-A 2006-303955
Patent Document 7: JP-A 2007-202377

SUMMARY OF THE INVENTION

Problem(s) to be Solved by the Invention

In each of the driving apparatuses disclosed in Patent Documents 1-6, an end face of the electromechanical transducer element and an end face of the vibration friction portion (vibration member) are bonded directly to each other in a state in which central axes of the electromechanical transducer and the vibration friction portion are (concentrically) aligned with each other. The vibration friction portion should efficiently transmit vibration (reciprocating displacement) generated by expansion and contraction of the electromechanical transducer element to the movement body (movement member). For this purpose, the central axis of the electromechanical transducer element and the central axis of the vibration friction portion are on the same line in each of the driving apparatuses disclosed in Patent Documents 1-6. As a result, if the position of either one of the electromechanical transducer element and the vibration friction portion is determined, then the position of the other is also determined. Such a conventional driving apparatus suffers from a problem that a product space (vacant space) cannot effectively be utilized along with reduction of the size of the driving apparatus.

In the electromechanical actuator structure disclosed in Patent Document 7, an end face of the electric actuator (electromechanical transducer element) and an end face of the stationary part of the elastic driving member (vibration friction portion) are bonded (or joined) directly to each other. As described above, the elastic driving member (vibration friction portion) should efficiently transmit vibration (reciprocating displacement) generated by expansion and contraction of the electric actuator (electromechanical transducer element) to the passive member (movement member). In the electromechanical actuator structure disclosed in Patent Document 7, however, the central axis of the electric actuator (electromechanical transducer element) and the central axis of the elastic actuation member (vibration friction portion) are displaced from each other, making such efficient transmission impossible.

Thus, one of problems to be solved by the present invention is to provide a driving apparatus capable of efficiently transmitting a reciprocating displacement of an electromechanical transducer element to a movement member and of effectively utilizing a product space (vacant space).

Other objects of the present invention will be apparent along with the following description.

Means to Solve the Problem(s)

The gist of an exemplary aspect of the present invention is as follows: It is understood that a driving apparatus includes an electromechanical transducer element having first and second end faces opposed to each other in a direction of expansion and contraction thereof, a vibration friction portion attached to the second end face of the electromechanical transducer element, and a movement member friction-bonded to the vibration friction portion. The movement member is movable along the direction of expansion and contraction of the electromechanical transducer element. The driving apparatus includes a vibration transmission member arranged between the second end face of the electromechanical transducer element and an end face of the vibration friction portion. According to the exemplary aspect of the present invention, a central axis of the electromechanical transducer element and a central axis of the vibration friction portion are not on the same line.

EFFECT(S) OF THE INVENTION

According to the present invention, the vibration transmission member is arranged between the second end face of the electromechanical transducer element and the end face of the vibration friction portion. Therefore, a reciprocating displacement of the electromechanical transducer element can efficiently be transmitted to the movement member. Additionally, since the central axis of the electromechanical transducer element and the central axis of the vibration friction portion are not on the same line, a product space (vacant space) can effectively be utilized.

BRIEF DESCRIPTION OF DRAWINGS

FIG. 6D is a graph showing a displacement of a movement member in a case where a vibration voltage member is provided (the driving apparatus according to the present invention).

EMBODIMENTS FOR CARRYING OUT THE INVENTION

Embodiments of the present invention will be described below with reference to the drawings.

Figure 1:
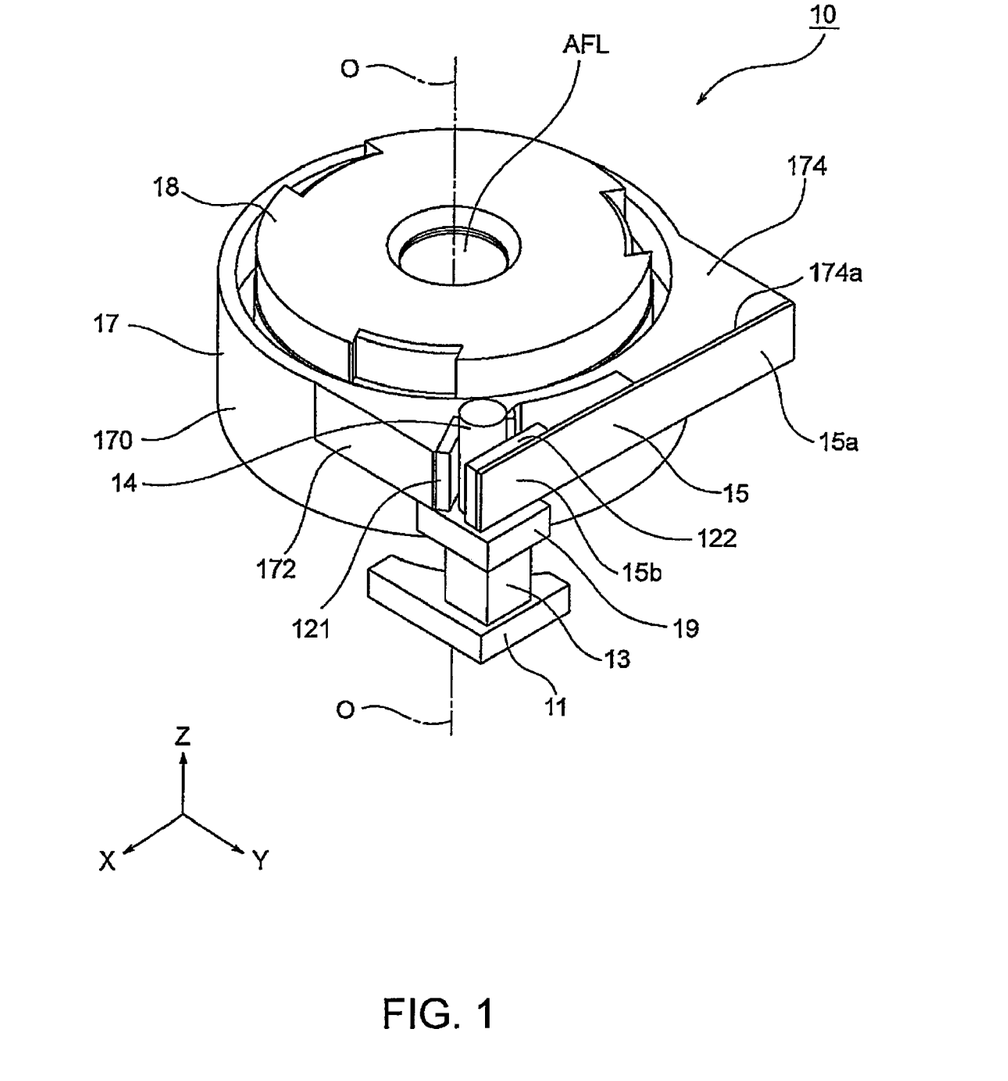
FIG. 1 is a perspective view of a driving apparatus according to a first exemplary embodiment of the present invention as seen obliquely from an upper front side of the driving apparatus.
Figure 2:
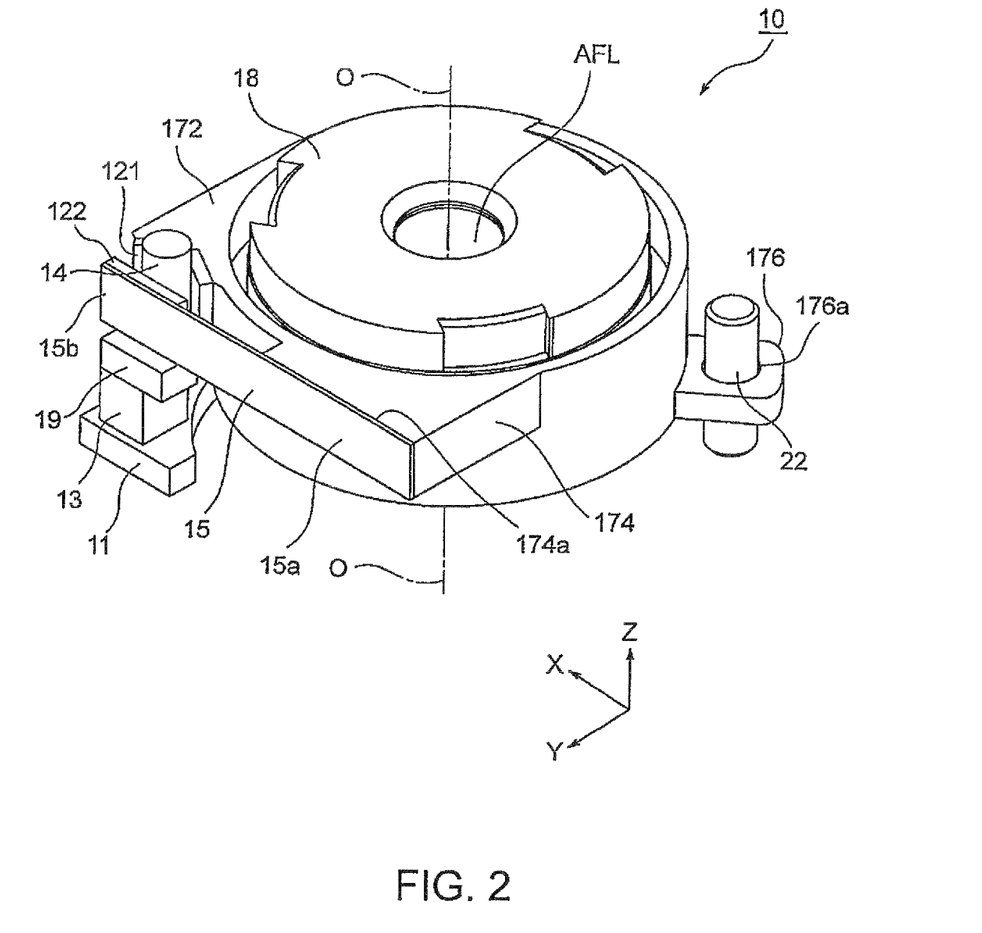
FIG. 2 is a perspective view of the driving apparatus illustrated in FIG. 1 as seen obliquely from an upper rear side of the driving apparatus.
Figure 3:
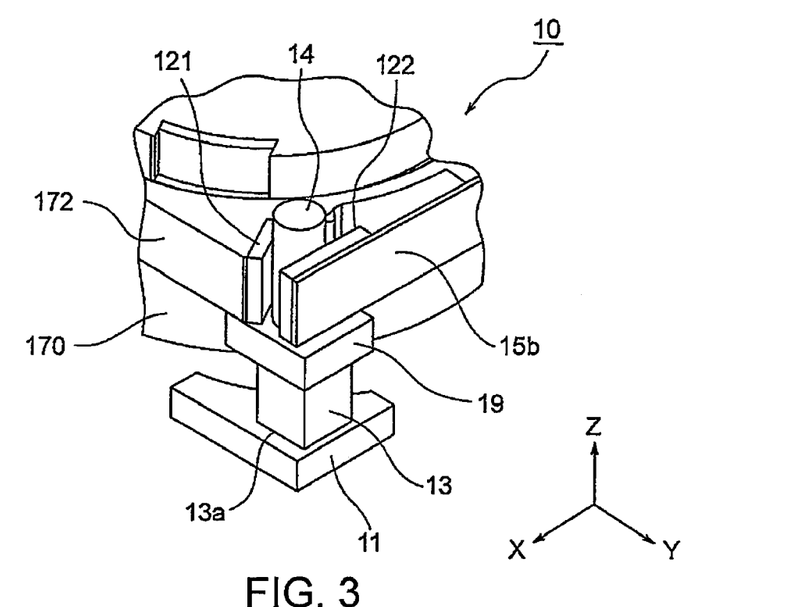
FIG. 3 is a partially enlarged perspective view showing a primary portion of the driving apparatus illustrated in FIG. 1.
Figure 4:
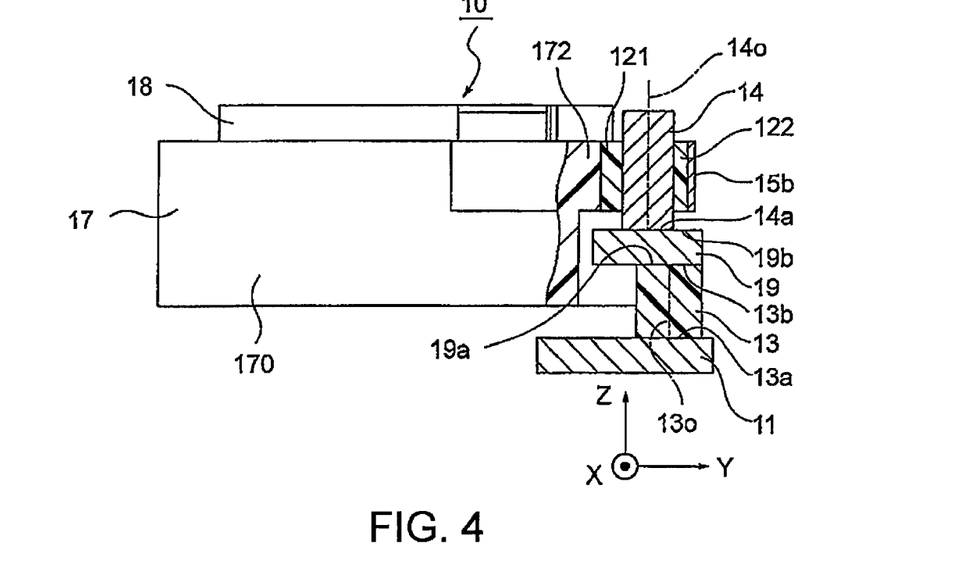
FIG. 4 is a partially cross-sectional front view showing part of the driving apparatus illustrated in FIG. 1.

Referring to FIGS. 1 through 4, the description will proceed to a driving apparatus 10 according to a first exemplary embodiment of the present invention. FIG. 1 is a perspective view of the driving apparatus 10 as seen obliquely from an upper front side of the driving apparatus 10. FIG. 2 is a perspective view of the driving apparatus 10 shown in FIG. 1 as seen obliquely from an upper rear side of the driving apparatus 10. FIG. 3 is a partially enlarged perspective view showing a primary portion of the driving apparatus 10 shown in FIG. 1. FIG. 4 is a partially cross-sectional front view showing part of the driving apparatus 10.

As shown in FIGS. 1 to 4, this example uses an orthogonal coordinate system (X, Y, Z). In the orthogonal coordinate system (X, Y, Z) of the state shown in FIGS. 1 to 4, the direction of the X-axis is defined as a fore-and-aft direction (depth direction), the direction of the Y-axis as a left-and-right direction (width direction), and the direction of the Z-axis as an up-and-down direction (height direction).

For example, the illustrated driving apparatus 10 is used as an auto-focus lens driving unit. In such a case, the up-and-down direction Z of the example shown in FIGS. 1 to 4 is a direction of an optical axis O of a lens.

An auto-focus lens driving unit includes a lens movable part and a lens driving part. The lens driving part drives the lens movable part as described later while it supports the lens movable part in a state such that the lens movable part can slide along the optical axis O.

The illustrated driving apparatus 10 is disposed within an enclosure, which is not shown in the drawings. The enclosure includes an upper cover (not shown), which is in the form of a cup, and a lower base (not shown). A stationary member (anchor) 11 is mounted on the lower base of the enclosure. The upper cover has an upper surface with a cylindrical portion (not shown) having an axis along the optical axis O of the lens.

Meanwhile, an image pickup device arranged on a substrate, which is not shown in the drawings, is mounted on a central portion of the lower base. The image pickup device picks up an object image focused by a movable lens (described later) and converts the image into electric signals. For example, the image pickup device may include a CCD (charge coupled device) type image sensor, a CMOS (complementary metal oxide semiconductor) type image sensor, or the like.

The enclosure houses therein a movement body tube (lens holder or lens support) 17 as a driven member. The driven member 17 has an axis that accords with the optical axis O of the lens. The movement body tube (lens holder or lens support) 17 has a cylindrical part 170 for holding a lens barrel (lens assembly) 18. The lens barrel (lens assembly) 18 holds an auto-focus lens AFL. The cylindrical part 170 of the lens holder 17 has an inner circumferential wall having an internal thread (not shown). On the other hand, the lens barrel 18 has an outer circumferential wall having an external thread (not shown), which engages with the aforementioned internal thread. Therefore, in order to attach the lens barrel 18 to the lens holder 17, the lens barrel 18 is rotated about the optical axis O with respect to the cylindrical part 170 of the lens holder 17 and screwed along the optical axis O, so that the lens barrel 18 is housed within the lens holder 17. The lens barrel 18 and the lens holder 17 are joined to each other by an adhesive or the like.

The lens holder 17 has a first protrusion 172 formed on an upper front end of the cylindrical part 170 so as to extend radially outward and rightward along the left-and-right direction Y with respect to the optical axis O. The first protrusion 172 is substantially in the form of a triangular prism. A first movement body (movement axis) 121 is fixed to a rear wall of the first protrusion 172. In the illustrated example, the first movement body 121 has a V-shaped structure.

The lens holder 17 has a second protrusion 174 formed at a position different from the position of the first protrusion 172 on an upper rear end of the cylindrical part 170 so as to extend radially outward and rightward along the lef-and-right direction Y. As with the first protrusion 172, the second protrusion 174 is substantially in the form of a triangular prism. The second protrusion 174 has a right-hand edge extending along the fore-and-aft direction X on the right end of the second protrusion 174. A first end (rear end) 15a of a spring 15 is fixed to the right-hand edge of the second protrusion 174 by an adhesive or the like. The spring 15 extends from the first end (rear end) 15a to a second end (front end) 15b along the right-hand edge 174a of the second protrusion 174 frontward in the fore-and-aft direction X. A second movement body (movement axis) 122, which is in the form of a plate, is attached to the second end (front end) 15b of the spring 15. In the illustrated example, the second movement body 122 has a plane structure.

This second movement body (movement axis) 122 is urged toward the first movement body (movement axis) 121 (leftward in the left-and-right direction Y) by the spring 15. A cylindrical vibration friction portion (vibration member) 14, which will be described later, is held between the first movement body (movement axis) 121 and the second movement body (movement axis) 122. In the illustrated example, the first movement body 121 and the second movement body 122 are made of the same material. A combination of the first movement body 121 and the second movement body 122 serves as a movement member.

A combination of the movement body tube (lens holder) 17, the lens barrel (lens assembly) 18, the spring 15, and the first and second movement bodies 121 and 122 constitute the lens movable part of the auto-focus lens driving unit.

As shown in FIG. 2, a cylindrical guide axis 22 is provided at a rear left side within the enclosure. The guide axis 22 extends in parallel with the optical axis O. The guide axis 22 rises from the lower base of the enclosure. The guide axis 22 and the vibration friction portion (vibration member) 14 are arranged at rotationally symmetric positions about the optical axis O.

Furthermore, the lens holder 17 has a third protrusion 176 formed on a rear left end of the cylindrical part 170 so as to extend radially outward. The third protrusion 176 has a through hole 176a in which the guide axis 22 is inserted. A combination of the guide axis 22 and the third protrusion 176 serves as a guide member for guiding the lens movable part along the optical axis O with respect to the enclosure while preventing the lens movable part from rotating. In other words, the guide member allows the lens movable part to linearly move only along the optical axis O with respect to the enclosure.

Now, the description will be made about the lens driving part of the auto-focus lens driving unit. The lens driving part (driving apparatus) 10 includes a laminated piezoelectric element 13, which functions as an electromechanical transducer element, the aforementioned stationary member (anchor) 11, the aforementioned vibration friction portion (vibration member) 14, and a vibration transmission member 19.

The laminated piezoelectric element 13 is capable of expansion and contraction along the optical axis O. The laminated piezoelectric element 13 has a structure in which a plurality of piezoelectric layers are stacked along the optical axis O. As shown in FIG. 4, the laminated piezoelectric element 13 has a first end face (lower end face) 13a and a second end face (upper end face) 13b, which are opposed to each other in the direction of expansion and contraction thereof. The stationary member (anchor) 11 is bonded to the first end face (lower end face) 13a of the laminated piezoelectric element 13 by an adhesive or the like. A combination of the laminated piezoelectric element 13 and the stationary member 11 is referred to as a piezoelectric unit.

The vibration friction portion (vibration member) 14 is attached to the second end face (upper end face) 13b of the laminated piezoelectric element 13 via the vibration transmission member 19 by an adhesive or the like. Specifically, the upper end face 13b of the laminated piezoelectric element 13 is bonded (or joined) to a lower end face 19a of the vibration transmission member 19 by an adhesive (adhesive resin), and a lower end face 14a of the vibration friction portion (vibration member) 14 is bonded (or joined) to an upper end face 19b of the vibration transmission member 19 by an adhesive (adhesive resin).

Thus, in the present exemplary embodiment, the vibration transmission member 19 is added (or interposed) between the vibration friction portion (vibration member) 14 and the laminated piezoelectric element (electromechanical transducer element) 13. Therefore, the vibration friction portion (vibration member) 14 only needs to have a structure considering the sliding capability with respect to the first and second movement bodies 121 and 122. Accordingly, it is not necessary to consider the resin adhesiveness to the electromechanical transducer element (laminated piezoelectric element) 13 when a material for the vibration friction portion (vibration member) 14 is to be selected. As a result, it is possible to increase not only the flexibility of material selection for the vibration friction portion (vibration member) 14, but also the flexibility of the shape of the vibration friction portion (vibration member) 14.

In the illustrated example, aluminum having a surface subjected to lubricative fluorine plating is used as a material for the vibration friction portion (vibration member) 14. Meanwhile, a metal or a fiber-reinforced resin composite having a high vibration transmission speed and a high rigidity is used as a material for the vibration transmission member 19 in order to transmit vibration from the electromechanical transducer element (laminated piezoelectric element) 19 efficiently to the vibration friction portion (vibration member) 14. For example, the fiber-reinforced resin composite may be carbon fiber reinforced plastics (CFRP).

Furthermore, the resonance phenomenon of the spring 15 can be suppressed by matching the material and shape of the vibration transmission member 19 with other members when the vibration transmission member 19 is to be added. Moreover, the vibration transmission member 19, which has a relatively simple shape, can compensate for performance variations of products caused by dimensional variations of the spring 15. In other words, since the vibration transmission member 19 can be produced with a simple shape, the performance variations in products of the driving apparatus 10 can be reduced.

Additionally, with addition of the vibration transmission member 19, vibration (reciprocating displacement) generated by expansion and contraction of the electromechanical transducer element (laminated piezoelectric element) 13 can efficiently be transmitted to the movement member (121, 122). As a result, the movement member (121, 122) can smoothly be moved (displaced).

The illustrated vibration transmission member 19 is in the form of a rectangular parallelepiped extending inwardly (i.e., leftward in the left-and-right direction Y and rearward in the fore-and-aft direction X) more than the electromechanical transducer element (laminated piezoelectric element) 13. As a result, as shown in FIG. 4, a central axis $13_O$ of the electromechanical transducer element (laminated piezoelectric element) 13 and a central axis $14_O$ of the vibration friction portion 14 can be displaced from each other. In other words, the central axis $13_O$ of the electromechanical transducer element (laminated piezoelectric element) 13 and the central axis $14_O$ of the vibration friction portion 14 are not on the same line.

In the illustrated example, the central axis $14_O$ of the vibration friction portion 14 is displaced inward (i.e., toward the optical axis O of the lens) from the central axis $13_O$ of the electromechanical transducer element (laminated piezoelectric element) 13.

Figure 5:
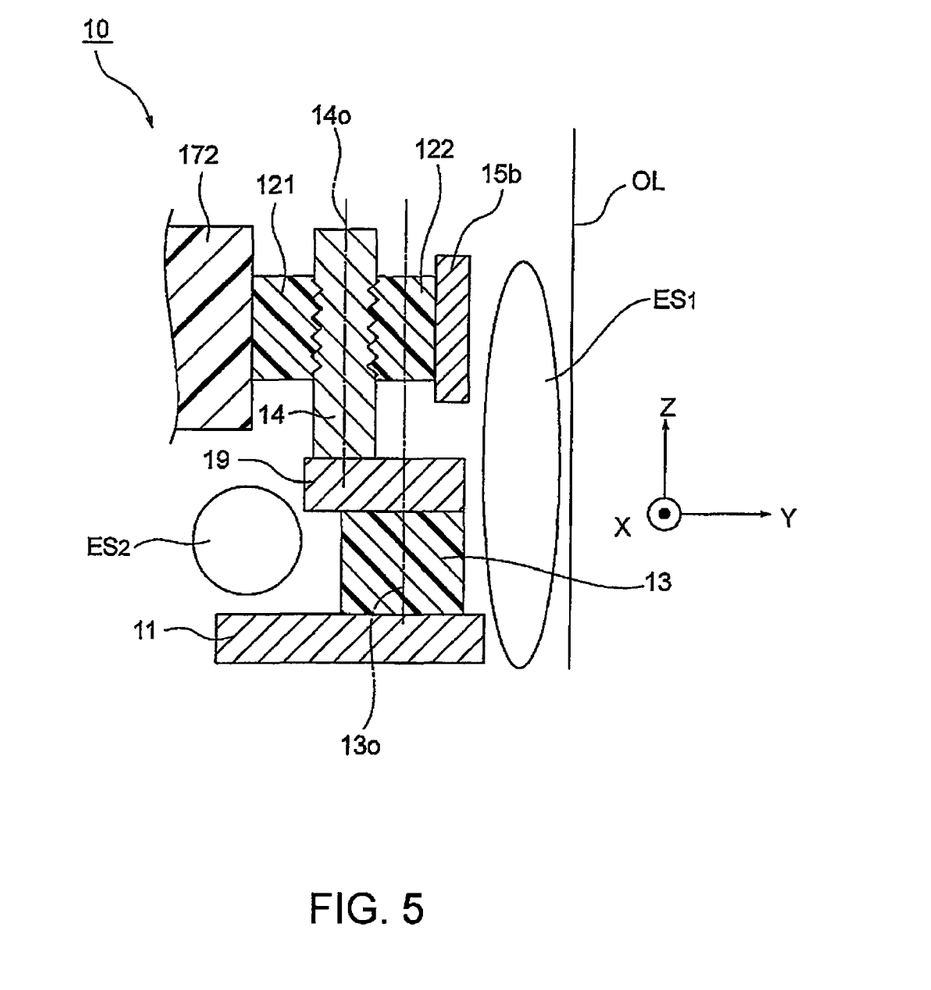
FIG. 5 is a cross-sectional front view, partially enlarged, for explanation of effects of the driving apparatus illustrated in FIGS. 1 to 4.

As described above, as shown in FIG. 5, addition of the vibration transmission member 19 allows the vibration friction portion 14 to be arranged within a range of the shape of the vibration transmission member 19. As a result, as shown in FIG. 5, when the central axis $14_O$ of the vibration friction portion 14 is displaced inward from the central axis $13_O$ of the electromechanical transducer element 13, vacant spaces $ES_1$ and $ES_2$ can be ensured around the electromechanical transducer element 13 and the vibration friction portion 14. Therefore, a space required for the driving apparatus 10 can be reduced. In other words, the vacant space $ES_1$ can be reduced. The line extending in the vertical direction at the right side of FIG. 5 represents an outline limit OL of the driving apparatus 10.

The first and second movement bodies 121 and 122 are friction-bonded to the vibration friction portion (vibration member) 14. The first movement body 121 has a V-shaped structure while the second movement body 122 has a plane structure.

As described above, the lens movable part includes the spring 15 for holding the vibration friction portion (vibration member) 14 between the first and second movement bodies 121 and 122. Specifically, the first end 15a of the spring 15 is fixed to the second protrusion plate 174. The spring 15 generates a pressing force for pressing the vibration friction portion (vibration member) 14 toward the first movement body 121 with the second movement body 122 attached to the second end 15b of the spring 15. In other words, the spring 15 urges the second movement body 122 toward the vibration friction portion (vibration member) 14 so as to hold the vibration friction portion (vibration member) 14 between the first and second movement bodies 121 and 122. Thus, the spring 15 serves as frictional force adding means (urging means) for adding a frictional force between the vibration friction portion (vibration member) 14 and the first and second movement bodies 121 and 122.

Since the vibration friction portion (vibration member) 14 is thus held between the first and second movement bodies 121 and 122, the position of the lens movable part can be regulated.

Additionally, in the illustrated exemplary embodiment, the first movement body 121 and the second movement body 122 are made of the same material. Therefore, a first coefficient of friction between the first movement body 121 and the vibration friction portion 14 and a second coefficient of friction between the second movement body 122 and the vibration friction portion 14 can substantially be equalized. Accordingly, the lens movable part can linearly be driven with stability. As a result, vibrational movement generated by expansion and contraction of the laminated piezoelectric element (electromechanical transducer element) 13 can efficiently be transmitted to the first and second movement bodies 121 and 122.

Furthermore, the driving apparatus 10 can be configured such that the spring 15 has a long effective length. Therefore, even if the dimension of the spring 15 and the assembly dimension have variations, influence on a load can be reduced. As a result, the driving apparatus 10 can be manufactured with reduced performance variations of products.

Thus, the spring 15 can be designed to have a long effective length. Therefore, the spring 15 can exhibit satisfactory elastic effects even if it is made of a resin mold rather than a metal.

The first movement body 121 having the V-shaped structure and the vibration friction portion 14 are in two-line contact with each other. The second movement body 122 having the plane structure and the vibration friction portion 14 are in one-line contact with each other. Therefore, the contact state of the friction bonding portions in the driving apparatus 10 is stabilized, resulting in frictional actuation having high reproducibility. An angle of the V-shaped structure of the first movement body 121 is preferably in a range of from 30 degrees up to 180 degrees.

Furthermore, the first and second movement bodies 121 and 122 are pressed against the vibration friction portion 14 by the spring 15. Since the first and second movement bodies 121 and 122 are thus pressed against the vibration friction portion 14, stable three-line contact of the three parts (including the first and second movement bodies 121 and 122 and the vibration friction portion 14) can be achieved.

Furthermore, the spring 15 is attached to the lens movable part, not to the vibration friction portion 13. Since the vibration friction portion 13 and the spring 15 are thus separated from each other, the resonance phenomenon can be prevented from being caused to the spring 15. Therefore, no phase inversion occurs between the vibration friction portion 13 and the spring 15. Thus, the lens movable part can efficiently be moved. Moreover, the lens movable part can be controlled so as to move in an expected direction.

As shown in FIG. 1, the lens driving part and the lens movement part are juxtaposed with respect to the optical axis O. Therefore, the height of the driving apparatus 10 can be reduced.

Figure 6A:
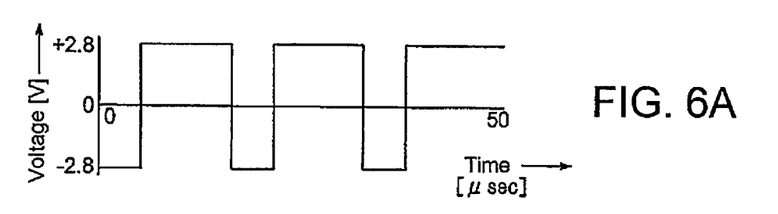
FIG. 6D is a graph showing a displacement of a movement member in a case where a vibration transmission member is provided (the driving apparatus according to the present invention).
FIG. 6B is a waveform chart showing a displacement of the laminated piezoelectric element.
FIG. 6C is a graph showing a displacement of a movement member in a case where no vibration transmission member is provided (a conventional driving apparatus).
Figure 6B:
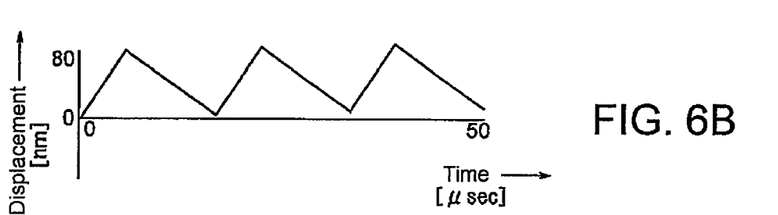
Figure 6C:
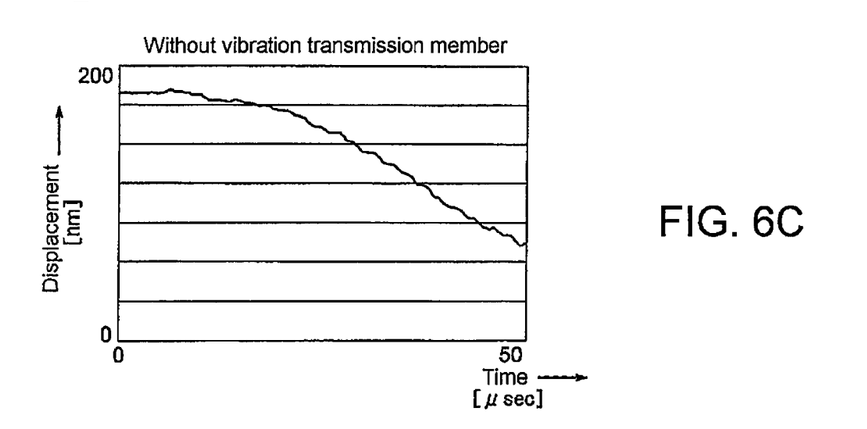
Figure 6D:
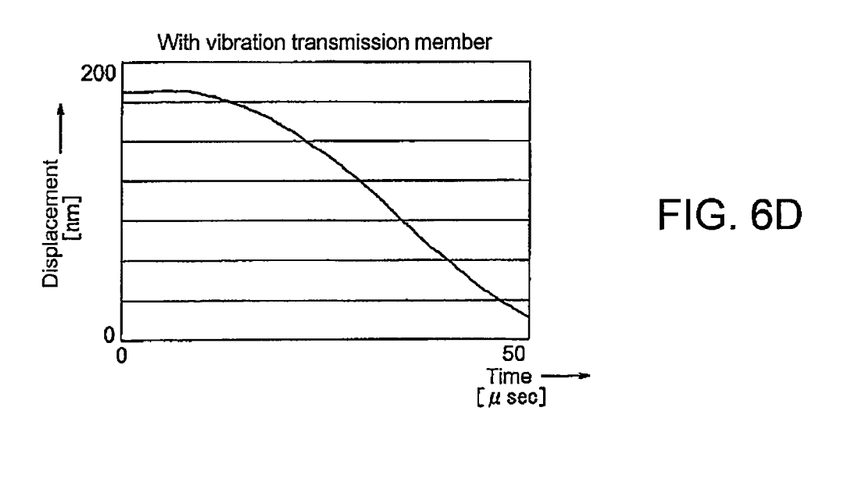

Referring now to FIGS. 6A through 6D, the description will proceed to a driving method of the driving apparatus according to the first exemplary embodiment of the present invention. FIGS. 6A and 6B show a change of a voltage applied to the laminated piezoelectric element 13 by a driving circuit 20 (not shown) and a displacement of the laminated piezoelectric element 13, respectively. FIG. 6C is a graph showing a displacement of the movement member (121, 122) in a case where no vibration transmission member 19 is provided (a conventional driving apparatus), and FIG. 6D is a graph showing a displacement of the movement member (121, 122) in a case where the vibration transmission member 19 is provided (the driving apparatus 10 according to the present invention). In FIGS. 6A to 6D, the horizontal axis represents the time [μsec]. The vertical axis in FIG. 6A represents the voltage [V]. In FIGS. 6B to 6D, the vertical axis represents the displacement [nm].

As shown in FIG. 6A, a square wave voltage having a waveform alternating a negative voltage and a positive voltage is applied as a driving voltage to the laminated piezoelectric element 13. In the illustrated example, the negative voltage is −2.8 V, and the positive voltage is +2.8 V. The driving frequency of the square wave voltage is 96 kHz, and the duty ratio thereof is 30/70. In the illustrated example, the duty ratio is defined as a ratio of a pulse width of the negative voltage and a pulse width of the positive voltage. The illustrated example shows a case in which the lens holder 17 (lens barrel 18) is continuously moved downward along the optical axis O (the up-and-down direction Z).

Under those circumstances, as shown in FIG. 6B, the laminated piezoelectric element 13 alternately demonstrates a rapid displacement (expansion) corresponding to the negative voltage, which has a short pulse width, and a slow displacement (contraction) corresponding to the positive voltage, which has a long pulse width.

Specifically, the square wave voltage (driving voltage) is applied to the laminated piezoelectric element 13 (FIG. 6A) so as to cause a reciprocating displacement (expansion and contraction) like a saw-tooth wave to the laminated piezoelectric element 13 (FIG. 6B).

Referring to FIG. 1 in addition to FIGS. 6A to 6D, the desription will proceed to operation of the driving apparatus 10. First, there will be described an operation in a case where the lens movable part is moved downward along the up-and-down direction Z.

It is assumed that a negative voltage having a short pulse width as shown in FIG. 6A is applied to the laminated piezoelectric element 13. In this case, as shown in FIG. 6B, the laminated piezoelectric element 13 demonstrates a rapid expansional displacement in the thickness direction. As a result, the vibration friction portion 14 is rapidly moved upward along the optical axis O (the up-and-down direction Z) via the vibration transmission member 19. At that time, the lens movable part (the first and second movement bodies 121 and 122) does not move because the inertial force of the lens movable part overcomes frictional forces between the vibration friction portion 14 and the first and second movement bodies 121 and 122 so that the lens movable part remains substantially at the same position.

It is assumed that a positive voltage having a long pulse width as shown in FIG. 6A is then applied to the laminated piezoelectric element 13. In this case, as shown in FIG. 6B, the laminated piezoelectric element 13 demonstrates a slow contractional displacement in the thickness direction. As a result, the vibration friction portion 14 is slowly moved downward along the optical axis O (the vertical direction Z) via the vibration transmission member 19. At that time, the lens movable part (the first and second movement bodies 121 and 122) moves downward substantially along the optical axis O (the vertical direction Z) together with the vibration friction portion 14 because the vibration friction portion 14 and the first and second movement bodies 121 and 122 are in surface contact with each other and are thus bonded to each other by frictional forces produced on contact surfaces therebetween.

In this manner, the negative voltage having the short pulse width and the positive voltage having the long pulse width are alternately applied to the laminated piezoelectric element 13 so as to cause the expansional displacement and the contractional displacement alternately to the laminated piezoelectric element 13. Therefore, the lens holder 17 (lens barrel 18) can continuously be moved downward along the optical axis O (the up-and-down direction Z).

Here, in a conventional driving apparatus having no vibration transmission member 19, a reciprocating displacement (vibration) of the laminated piezoelectric element (electromechanical transducer element) 13 is transmitted directly to the vibration friction portion 14. Therefore, it is difficult to efficiently transmit vibration (reciprocating displacement) generated by expansion and contraction of the laminated piezoelectric element (electromechanical transducer element) 13 to the movement member (121, 122). As a result, the lens movable part (the movement member) cannot be moved smoothly as shown in FIG. 6C.

In contrast, according to the driving apparatus 10 having the vibration transmission member 19 of this embodiment, a reciprocating displacement (vibration) of the laminated piezoelectric element (electromechanical transducer element) 13 is transmitted to the vibration friction portion 14 via the vibration transmission member 19. Therefore, vibration (reciprocating displacement) generated by expansion and contraction of the laminated piezoelectric element (electromechanical transducer element) 13 can efficiently be transmitted to the movement member (121, 122). As a result, the lens movable part (the movement member) can be moved smoothly as shown in FIG. 6D.

As described above, a reciprocating displacement like a saw-tooth wave is caused to the electromechanical transducer element 13. The reciprocating displacement of the electromechanical transducer element 13 is transmitted to the vibration friction portion 14 via the vibration transmission member 19. Accordingly, the movement member (121, 122) can linearly be driven smoothly in a predetermined direction (downward in the above example).

Conversely, it is assumed that the lens movable part is moved upward along the optical axis O (the up-and-down direction Z). This movement can be achieved by alternately applying a negative voltage having a long pulse width and a positive voltage having a short pulse width to the laminated piezoelectric element 13.

The above exemplary embodiment describes the case in which the duty ratio of the square wave voltage (a ratio of the pulse width of a negative voltage and the pulse width of a positive voltage or a ratio of the pulse width of a positive voltage and the pulse width of a negative voltage) is 30/70. However, the lens movable part (the movement member) can smoothly be moved as long as the aforementioned duty ratio is in a range of 25/75 to 35/65.

Furthermore, in the above exemplary embodiment, a square wave voltage is applied to the electromechanical transducer element 13 to cause a reciprocating displacement like a saw-tooth wave to the electromechanical transducer element 13. As a matter of course, the method of causing a reciprocating displacement like a saw-tooth wave to the electromechanical transducer element 13 is not limited to this example.

Moreover, in the above exemplary embodiment, a non-slip state and a slip state of the movement member (121, 122) with respect to the vibration friction portion 14 are repeated so as to linearly move the movement member (121, 122) in a predetermined direction. In other words, the driving apparatus 10 is driven so as to cause a slippage between the vibration friction portion 14 and the movement member (121, 122) upon one of occurrences of expansion and contraction of the electromechanical transducer element 13 and to cause no slippage between the vibration friction portion 14 and the movement member (121, 122) upon the other occurrence of expansion and contraction of the electromechanical transducer element 13. In this field of technology, such a driving method is referred to as a non-slip/slip driving method.

However, the movement member (121, 122) may linearly be moved in a predetermined direction by repeating a slip state of the movement member (121, 122) with respect to the vibration friction portion 14. In other words, the driving apparatus 10 may be driven so as to cause a slippage between the vibration friction portion 14 and the movement member (121, 122) upon both of occurrences of expansion and contraction of the electromechanical transducer element 13. In this field of technology, such a driving method is referred to as a slip/slip driving method.

Now, the laminated piezoelectric element 13 will be described. The laminated piezoelectric element 13 has a shape of a rectangular parallelepiped. The element size is 0.9 [mm]×0.9 [mm]×1.5 [mm]. A material having a low Qm, such as PZT, is used as a piezoelectric material. The laminated piezoelectric element 13 is produced by alternately stacking 50 layers of a piezoelectric material having a thickness of 20 [μm] and an internal electrode having a thickness of 2 [μm] like a comb. The size of the effective internal electrode in the laminated piezoelectric element 13 is 0.6 [mm]×0.6 [mm]. In other words, a ring-shaped dead zone (clearance) having a width of 0.15 [mm] is present outside of the effective internal electrode of the laminated piezoelectric element 13.

In the driving apparatus 10 according to the aforementioned first exemplary embodiment, the central axis $14_O$ of the vibration friction portion 14 is displaced inward from the central axis $13_O$ of the electromechanical transducer element 13. However, the central axis $14_O$ of the vibration friction portion 14 may be displaced outward from the central axis $13_O$ of the electromechanical transducer element 13 as shown in a driving apparatus 10A of FIG. 7 according to a second exemplary embodiment of the present invention.

Figure 7:
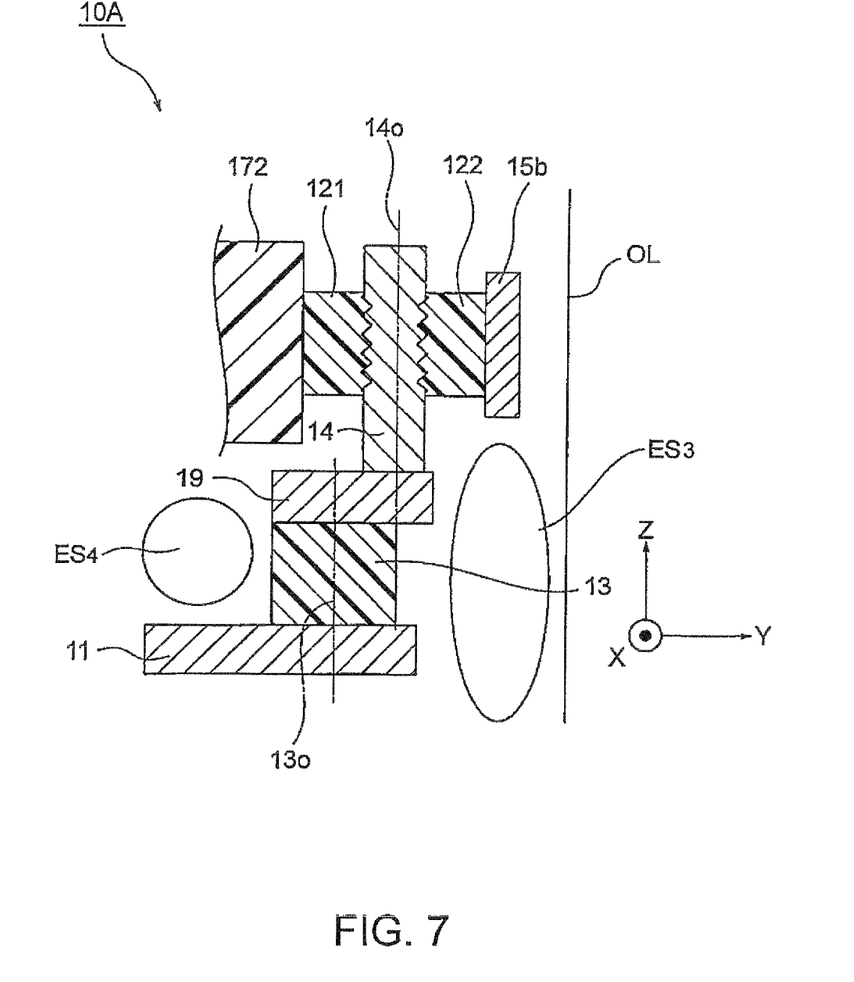
FIG. 7 is a cross-sectional front view, partially enlarged, showing a primary portion of a driving apparatus according to a second exemplary embodiment of the present invention.

As shown in FIG. 7, the central axis $14_O$ of the vibration friction portion 14 is displaced outward from the central axis $13_O$ of the electromechanical transducer element 13 by adding the vibration transmission member 19. Thus, vacant spaces $ES_3$ and $ES_4$ around the electromechanical transducer element 13 and the vibration friction portion 14 can be changed flexibly. As a result, the vacant space ES) can effectively be utilized so as to dispose other parts therein and it is possible to improve flexibility in design.

Figure 8:
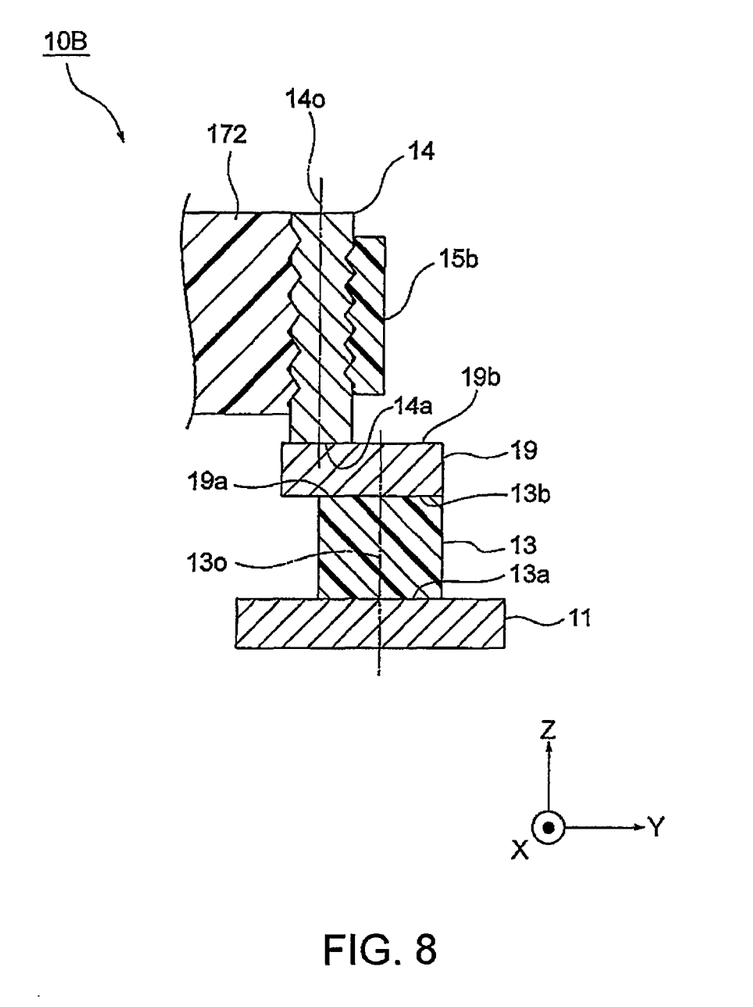
FIG. 8 is a cross-sectional front view, partially enlarged, showing a primary portion of a driving apparatus according to a third exemplary embodiment of the present invention.

Referring to FIG. 8, the description will proceed to a driving apparatus 10B according to a third exemplary embodiment of the present invention. FIG. 8 is a cross-sectional front view, partially enlarged, showing a primary part of the driving apparatus 10B. The illustrated driving apparatus 10B has the same configuration as the driving apparatus 10 shown in FIGS. 1 to 4 except that the first and second movement bodies 121 and 122 are omitted.

Specifically, in the driving apparatus 10B, the first protrusion 172 also serves as the first movement body, and the second end 15b of the spring 15 also serves as the second movement body. In other words, the first movement body 121 and the first protrusion 172 of the driving apparatus 10 shown in FIGS. 1 to 4 are integrated into one first protrusion 172 in the driving apparatus 10B shown in FIG. 8. The second movement body 122 and the spring 15 of the driving apparatus 10 shown in FIGS. 1 to 4 are integrated into one spring 15 in the driving apparatus 10B shown in FIG. 8.

According to the driving apparatus 10B thus configured, the number of parts can be reduced as compared to the driving apparatus 10 shown in FIGS. 1 to 4.

In the driving apparatus 10B shown in FIG. 8, both of the first movement body 121 and the second movement body 122 are omitted. Nevertheless, only one of the first movement body 121 and the second movement body 122 may be omitted.

Figure 9:
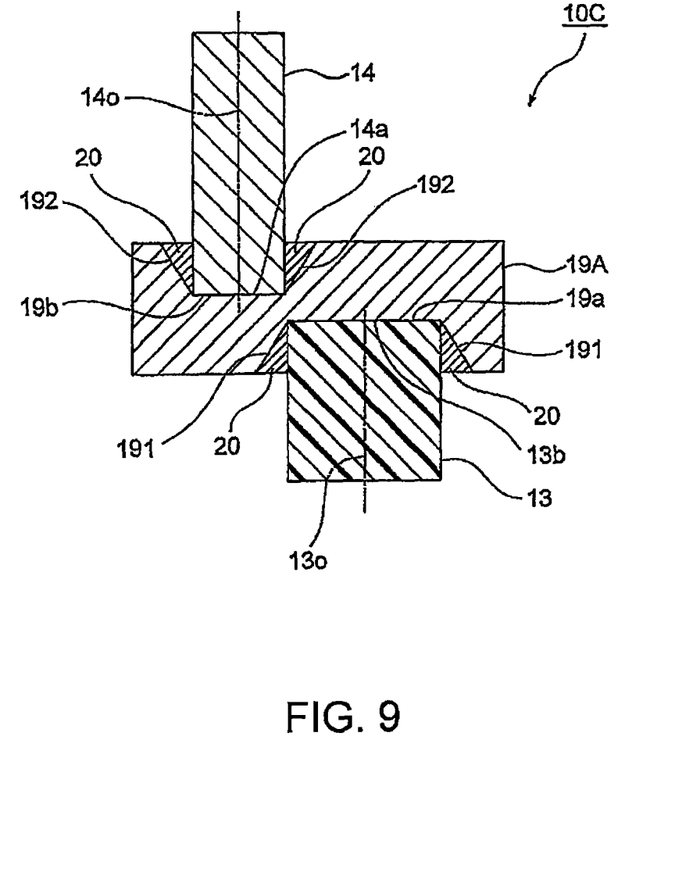
FIG. 9 is a cross-sectional front view showing a vibration transmission member used in a driving apparatus according to a fourth exemplary embodiment of the present invention, along with a vibration friction portion and a laminated piezoelectric element (electromechanical transducer element).

Referring to FIG. 9, the description will proceed to a driving apparatus 10C according to a fourth exemplary embodiment of the present invention. FIG. 9 is a cross-sectional front view showing a vibration transmission member 19A used in the driving apparatus 10C along with the vibration friction portion 14 and the laminated piezoelectric element (electromechanical transducer element) 13.

The illustrated driving apparatus 10C has the same configuration as the driving apparatus 10 shown in FIGS. 1 to 4 except that the vibration transmission member 19 is modified into a vibration transmission member 19A as described later.

The length and width (dimension) of the vibration transmission member 19A on the horizontal plane are greater than those of the vibration transmission member 19 shown in FIGS. 1 to 4.

As shown in FIG. 9, the vibration transmission member 19A has a first recessed portion (hollow) 191 formed on a surface opposed to the upper end face 13b of the laminated piezoelectric element (electromechanical transducer element) 13. The vibration transmission member 19A has a second recessed portion (hollow) 192 formed on a surface opposed to the lower end face 14a of the vibration friction portion 14. Thus, the laminated piezoelectric element (electromechanical transducer element) 13 is fitted in the first recessed portion 191 with a play, and the lower end face 14a of the vibration friction portion 14 is fitted in the second recessed portion 192.

The first recessed portion (hollow) 191 is for clarifying an application area of an adhesive (adhesive resin) 20 between the upper end face 13b of the laminated piezoelectric element (electromechanical transducer element) 13 and the lower end face 19a of the vibration transmission member 19A. The second recessed portion (hollow) 192 is for clarifying an application area of an adhesive (adhesive resin) 20 between the lower end face 14a of the vibration friction portion 14 and the upper end face 19b of the vibration transmission member 19A. Those recessed portions can improve the readiness of assembly and the strength of the driving apparatus 10C.

Furthermore, when the lower end face 19a of the vibration transmission member 19A is joined (or bonded) to the upper end face 13b of the laminated piezoelectric element (electromechanical transducer element) 13 by the adhesive (adhesive resin) 20 as shown in FIG. 9, the adhesive (adhesive resin) 20 is pushed aside toward an inner sidewall of the first recessed portion (hollow) 191 of the vibration transmission member 19A. Similarly, when the upper end face 19b of the vibration transmission member 19A is joined (or bonded) to the lower end face 14a of the vibration friction portion 14 by the adhesive (adhesive resin) 20, the adhesive (adhesive resin) 20 is pushed aside toward an inner sidewall of the second recessed portion (hollow) 192 of the vibration transmission member 19A.

As a result, as shown in FIG. 9, the laminated piezoelectric element (electromechanical transducer element) 13, the vibration transmission member 19A, and the vibration friction portion 14 can be attached to each other without a layer of the adhesive resin therebetween. Accordingly, vibration generated by expansion and contraction of the laminated piezoelectric element (electromechanical transducer element) 13 can efficiently be transmitted to the first and second movement bodies (movement member) 121 and 122 via the vibration transmission member 19A and the vibration friction portion 14.

In the driving apparatus 10C shown in FIG. 9, the recessed portions (hollows) 191 and 192 are formed in both of the lower end face 19a and the upper end face 19b of the vibration transmission member 19A. However, a recessed portion (hollow) may be formed only in one of the lower end face 19a and the upper end face 19b of the vibration transmission member 19A.

In the exemplary aspect of the present invention, the driving apparatus may be for moving a cylindrical driven member along a central axis of the driven member. The movement member may be attached to the driven member and disposed adjacent to the periphery of the driven member. For example, the vibration transmission member may extend inward toward the central axis of the driven member with respect to the electromechanical transducer element. In this case, the central axis of the vibration friction portion is displaced inward from the central axis of the electromechanical transducer element. Conversely, the vibration transmission member may extend outward from the central axis of the driven member with respect to the electromechanical transducer element. In this case, the central axis of the vibration friction portion is displaced outward from the central axis of the electromechanical transducer element. The vibration friction portion may be in the form of a cylinder. The movement member may include a first movement body and a second movement body that hold the vibration friction portion therebetween. The first movement body may have a V-shaped structure, and the second movement body may have a plane structure. An angle of the V-shaped structure of the first movement body is preferably in a range of 30 degrees up to 180 degrees.

It is preferable for the aforementioned driving apparatus to further include frictional force adding means for generating a frictional force between the vibration friction portion and the first movement body and between the vibration friction portion and the second movement body. The frictional force adding means may comprise an urging member having a first end attached to the actuated member and a second end to which the second movement body is attached. In this case, the urging member generates a pressing force for the first movement body and the second movement body to hold and press the vibration friction portion between the first movement body and the second movement body.

In the above driving apparatus, the driven member may include a cylindrical part, a first protrusion extending outward from the cylindrical part for holding the first movement body, and a second protrusion extending outward from the cylindrical part at a position different from the position of the first protrusion. In this case, the urging member may comprise a spring having a first end fixed to the second protrusion and a second end to which the second movement body is attached.

In the above driving apparatus, the driven member may include a cylindrical part, a first protrusion extending outward from the cylindrical part and also serving as the first movement body, and a second protrusion extending outward from the cylindrical part at a position different from the position of the first protrusion. In this case, the urging member may comprise a spring having a first end fixed to the second protrusion and a second end also serving as the second movement body.

Furthermore, in the above driving apparatus, it is preferable for the vibration transmission member to have a first hollow in which the second end face of the electromechanical transducer element is fitted with a play and a second hollow in which the end face of the vibration friction portion is fitted with a play.

While the present invention has been particularly shown and described with reference to the exemplary embodiments thereof, the present invention is not limited to those embodiments. It will be understood by those of ordinary skill in the art that various changes in form and details may be made therein without departing from the spirit and scope of the present invention as defined by the claims. For example, in the above exemplary embodiments, the first movement body has a V-shaped structure, and the second movement body has a plane structure. As a matter of course, the shapes of the first and second movement bodies are not limited to those examples. Furthermore, in the above exemplary embodiments, the vibration friction portion is in the form of a cylinder (a rod). Nevertheless, the vibration friction portion may have a complicated shape (deformed shape).

This application is based upon and claims the benefit of priority from Japanese patent application No. 2008-223561, filed on Sep. 1, 2008, the disclosure of which is incorporated herein in its entirety by reference.

The invention claimed is:

1. A driving apparatus comprising:
an electromechanical transducer element having first and second end faces opposed to each other in a direction of expansion and contraction thereof;
a vibration friction portion attached to the second end face of the electromechanical transducer element;
a movement member friction-bonded to the vibration friction portion, the movement member being movable along the direction of expansion and contraction of the electromechanical transducer element; and
a vibration transmission member arranged between the second end face of the electromechanical transducer element and an end face of the vibration friction portion,
wherein the vibration friction portion is pillar-shaped and has a central axis which extends in a direction parallel to the direction of expansion and contraction of the electromechanical transducer element,
wherein a central axis of the electromechanical transducer element and the central axis of the vibration friction portion are not on a same line,
wherein the driving apparatus is adapted to move a cylindrical driven member along a central axis of the driven member,
wherein the movement member is attached to the driven member and disposed adjacent to a periphery of the driven member,
wherein the vibration transmission member extends inward toward the central axis of the driven member with respect to the electromechanical transducer element, and
wherein the central axis of the vibration friction portion is displaced inward from the central axis of the electromechanical transducer element.

2. A driving apparatus comprising:
an electromechanical transducer element having first and second end faces opposed to each other in a direction of expansion and contraction thereof;
a vibration friction portion attached to the second end face of the electromechanical transducer element;
a movement member friction-bonded to the vibration friction portion, the movement member being movable along the direction of expansion and contraction of the electromechanical transducer element; and
a vibration transmission member arranged between the second end face of the electromechanical transducer element and an end face of the vibration friction portion,
wherein the vibration friction portion is pillar-shaped and has a central axis which extends in a direction parallel to the direction of expansion and contraction of the electromechanical transducer element,
wherein a central axis of the electromechanical transducer element and the central axis of the vibration friction portion are not on a same line,
wherein the driving apparatus is adapted to move a cylindrical driven member along a central axis of the driven member,
wherein the movement member is attached to the driven member and disposed adjacent to a periphery of the driven member,
wherein the vibration transmission member extends outward from the central axis of the driven member with respect to the electromechanical transducer element, and
wherein the central axis of the vibration friction portion is displaced outward from the central axis of the electromechanical transducer element.

3. The driving apparatus as recited in claim 1, wherein the pillar-shaped vibration friction portion is cylindrical, and wherein the movement member includes a first movement body and a second movement body that hold the vibration friction portion therebetween.

4. The driving apparatus as recited in claim 3, wherein the first movement body has a V-shaped structure, and wherein the second movement body has a plane structure.

5. The driving apparatus as recited in claim 4, wherein an angle of the V-shaped structure of the first movement body is in a range of 30 degrees up to 180 degrees.

6. The driving apparatus as recited in claim 3, further comprising a frictional force adding unit which generates a frictional force between the vibration friction portion and the first movement body and between the vibration friction portion and the second movement body.

7. The driving apparatus as recited in claim 6, wherein the frictional force adding unit comprises an urging member having a first end attached to the driven member and a second end to which the second movement body is attached, and wherein the urging member generates a pressing force for the first movement body and the second movement body to hold and press the vibration friction portion between the first movement body and the second movement body.

8. The driving apparatus as recited in claim 7, wherein the driven member includes a cylindrical part, a first protrusion extending outward from the cylindrical part for holding the first movement body, and a second protrusion extending outward from the cylindrical part at a position different from a position of the first protrusion, and wherein the urging member comprises a spring having a first end fixed to the second protrusion and a second end to which the second movement body is attached.

9. The driving apparatus as recited in claim 7, wherein the driven member includes a cylindrical part, a first protrusion extending outward from the cylindrical part and also serving as the first movement body, and a second protrusion extending outward from the cylindrical part at a position different from a position of the first protrusion, and wherein the urging member comprises a spring having a first end fixed to the second protrusion and a second one also serving as the second movement body.

10. The driving apparatus as recited in claim 1, wherein the vibration transmission member comprises:
   a first hollow in which the second end face of the electro-mechanical transducer element is fitted with a play, and
   a second hollow in which the end face of the vibration friction portion is fitted with a play.

11. The driving apparatus as recited in claim 2, wherein the pillar-shaped vibration friction portion is cylindrical, and wherein the movement member includes a first movement body and a second movement body that hold the vibration friction portion therebetween.

12. The driving apparatus as recited in claim 11, wherein the first movement body has a V-shaped structure, and wherein the second movement body has a plane structure.

13. The driving apparatus as recited in claim 12, wherein an angle of the V-shaped structure of the first movement body is in a range of 30 degrees up to 180 degrees.

14. The driving apparatus as recited in claim 11, further comprising a frictional force adding unit which generates a frictional force between the vibration friction portion and the first movement body and between the vibration friction portion and the second movement body.

15. The driving apparatus as recited in claim 14, wherein the frictional force adding unit comprises an urging member having a first end attached to the driven member and a second end to which the second movement body is attached, and wherein the urging member generates a pressing force for the first movement body and the second movement body to hold and press the vibration friction portion between the first movement body and the second movement body.

16. The driving apparatus as recited in claim 15, wherein the driven member includes a cylindrical part, a first protrusion extending outward from the cylindrical part for holding the first movement body, and a second protrusion extending outward from the cylindrical part at a position different from a position of the first protrusion, and wherein the urging member comprises a spring having a first end fixed to the second protrusion and a second end to which the second movement body is attached.

17. The driving apparatus as recited in claim 15, wherein the driven member includes a cylindrical part, a first protrusion extending outward from the cylindrical part and also serving as the first movement body, and a second protrusion extending outward from the cylindrical part at a position different from a position of the first protrusion, and wherein the urging member comprises a spring having a first end fixed to the second protrusion and a second one also serving as the second movement body.

18. The driving apparatus as recited in claim 2, wherein the vibration transmission member comprises:
   a first hollow in which the second end face of the electro-mechanical transducer element is fitted with a play, and
   a second hollow in which the end face of the vibration friction portion is fitted with a play.

* * * * *